OLIVER M. MARTIN, OF ANN ARBOR, MICHIGAN.

Letters Patent No. 84,893, dated December 15, 1868.

IMPROVEMENT IN CURING HAMS, BEEF, AND OTHER MEATS.

The Schedule referred to in these Letters Patent and making part of the same.

*To whom it may concern:*

Be it known that I, OLIVER M. MARTIN, of Ann Arbor, in the county of Washtenaw, and State of Michigan, have invented a new and useful Improvement in Process for Curing Hams, Bacon, Beef, and other Meats; and do declare that the following is a true and accurate description thereof.

The object of this invention is to effectually preserve hams and other meats that it is desirable to cure, without being obliged to pack them in brine.

To accomplish this end, after the animal heat of the meats has been exhausted, of a ham, for instance, insert a small steel rod almost through the ham, along the bone. Then inject, through a properly-shaped tin tube, enough strong brine to penetrate the meat well around the bone. This brine should be made of salt, sugar, saltpetre, and water, and should be made quite strong. Then put one-half a bushel of dry rock-salt and a quarter of a pound of saltpetre into a large kettle, over a hot fire, and, when thoroughly heated through, and steaming well, take out enough salt to admit the hams, which should be put in with the skin-side down. Then cover them well up with the salt which has been taken out, and let them steam for about three minutes. Then turn them over, with the flesh-side down, and cover again with the salt, and let them steam for about two minutes.

The hams, when taken out, will be found perfectly cured, and will keep well for a year, and be much better in flavor than when cured in the ordinary manner.

The proportions named are sufficient to preserve six ordinary-sized hams, and the process is equally as well adapted for all kinds of meats, care being taken to inject sufficient brine next the bones, to thoroughly impregnate the surrounding meat. After this is done, the hams may be smoked in the usual manner, and will be found much better than when cured in the ordinary way.

I do not claim injecting brine into meat, as I am well aware that it has been done before; but

What I claim as new, and desire to secure by Letters Patent, is—

The process, herein described, of preserving meat, by steaming it in salt and saltpetre, after brine has been injected into the meat, substantially as and for the purposes described.

OLIVER M. MARTIN.

Witnesses:
B. H. MARTIN,
JAMES B. GOTT.